Oct. 4, 1932.     O. A. PARKER     1,880,357
AUTOMOBILE WHEEL
Original Filed May 19, 1926    2 Sheets-Sheet 1

Inventor

Orrel A. Parker

By Slough and Canfield
Attorney

Oct. 4, 1932.    O. A. PARKER    1,880,357
AUTOMOBILE WHEEL
Original Filed May 19, 1926    2 Sheets-Sheet 2
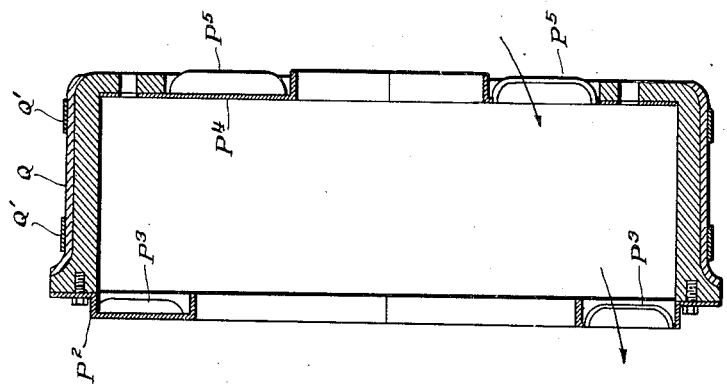
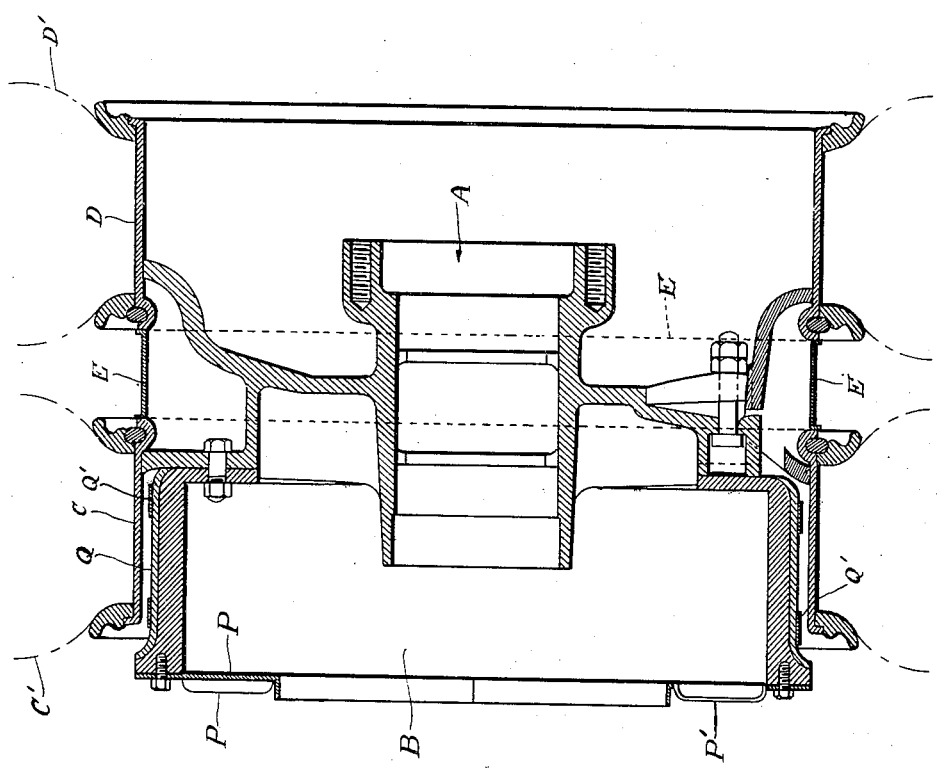
Inventor
Orrel A. Parker
By Slough and Canfield
Attorney Patented Oct. 4, 1932

1,880,357

UNITED STATES PATENT OFFICE

ORREL A. PARKER, OF CLEVELAND, OHIO, ASSIGNOR TO THE PARKER WHEEL COMPANY, OF CLEVELAND, OHIO, A CORPORATION OF OHIO

AUTOMOBILE WHEEL

Continuation of application Serial No. 110,090, filed May 19, 1926. This application filed October 28, 1930. Serial No. 491,676.

This invention relates generally to automobile wheels and more particularly to wheels carrying dual tires, that is two tires arranged side by side for the purpose of jointly carrying the load.

The invention is also particularly adapted for rear wheels provided with brake drums inasmuch as dual tires are usually employed at the rear of the vehicle only, but the principle of the invention is applicable wherever dual tires are employed. Dual tires are usually employed on busses and trucks and in their use, there are certain obstacles which are encountered and must be taken into consideration.

First of all are the limitations in the over all width of the axle, as often the maximum width of rear axle is prescribed by law, and under these limitations it is usual to insert the brake drum inside the wheel body and the inner tire.

Secondly, small wheels are almost a necessity to accommodate balloon tires and keep down excessive height.

Third, large sized brakes are necessary to insure safety and these produce,

Fourth, the brake heat, and also interference with the cooling of the tires.

The object of my invention therefore is to provide means whereby balloon or high pressure dual tires can be employed upon wheel bodies of small diameters with large sized brake drums inside the inner tire, and still keep the brake drums and tires comparatively cool, by laterally distributing the air current of the wheel body or by fans to aid the production of air currents and carrying off the heat of the drums and tires generated by friction.

This object I accomplish by interposing a deflecting band or shield between the tire carrying rims for the purpose of preventing the radial escape, between the rims, of the air currents set up by the wheel body or by fans, and cause these currents to move laterally beneath the tire carrying rims and over the outer surface of the brake drum and in some instances through the brake drum.

My invention also contemplates surrounding the brake drum with a non-conducting covering and also providing the brake drum with means for drawing or forcing air therethrough in either direction.

The invention also includes certain other details of construction and combination of parts, all of which will be fully described hereinafter and pointed out in the appended claims.

While my invention is capable of use in connection with various types of wheel bodies I have, for the purpose of illustrating the invention, shown the same applied to a wheel body substantially of the type shown and described in the application of John W. Holt filed July 19, 1924, Serial No. 726,909, and in these drawings:

Fig. 2 is a vertical sectional view of the wheel body with the brake drum connected thereto and the dual tire carrying rims arranged thereon and also the deflecting shield arranged between the rims;

Fig. 3 is a detail sectional view of another type of brake drum detached from the wheel;

Figure 1:
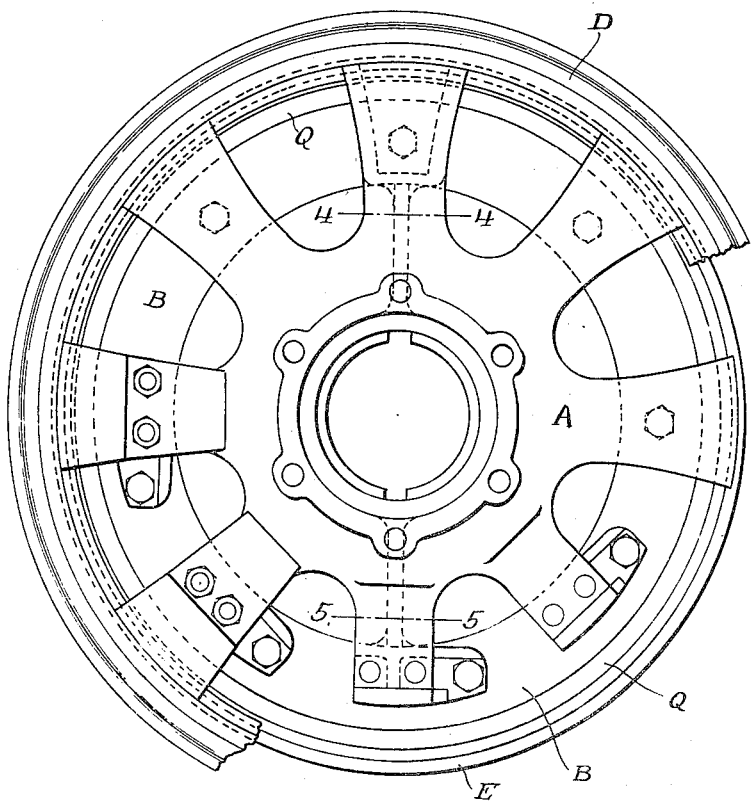
Fig. 1 is a face view of a wheel body provided with dual tires and equipped with my improvement, certain portions of the structures being broken away in order to more clearly disclose the other features of construction.
Figure 4:
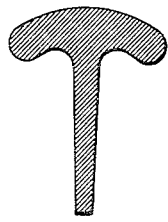
Figs. 4 and 5 are detail sectional views showing different types of T-shaped spokes constituting parts of the wheel body.
Figure 5:
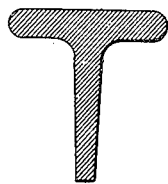

In giving effect to my invention I preferably employ a spoked wheel body A having a brake drum B connected to the inner or rear side thereof. The wheel body A is intended to, and does, support two demountable tire carrying rims C and D, which carry the tires C' and D' preferably of the pneumatic type, either balloon or high pressure.

The rims are spaced axially apart upon the wheel body as shown, and it will be noted that the inner tire carrying rim C extends almost entirely over the periphery of the brake drum B, and that the distance or clearance between the brake drum B and rim C is comparatively small.

This is almost a necessity, for, as before stated, owing to the limitations of overall width, it is necessary to attach the brake drum to the wheel body within the inner rim; and these brake drums must of necessity be large in size.

It has been found that wherever dual tires are arranged upon a wheel body, with an axial space between the tire carrying rims, and the brake drum within the inner tire rim, that the brake drum and rims become heated, and that this heat is not dissipated but is communicated to the tires because the air currents set up by the revolving wheel body pass out radially between the tire carrying rims; whereas to cool the brake drum and rims, these currents should be deflected laterally so that the heat generated by friction shall be driven beneath the rims and between the inner rim and brake drum and through the brake drum and brake mechanism in case the brake drum has openings in the same.

This I accomplish by providing an encircling band or shield E, which is of such width as to fill the space between the inner rim C and outer rim D, said band or shield being applied to the wheel body A at the same time that the rims C and D are applied and also tensioned or secured by the same means or any other suitable means. This band or shield E prevents the radial escape of the air currents set up by the revolving wheel body, and these currents impinging upon the band or shield E are deflected or directed laterally, and when given this lateral direction they pass along the inner sides of the rims, between the inner rim C and brake drum B and also through the brake drum, carrying away the heat generated by friction. In this manner the heat of the brake drum, or at least a great portion thereof, is not communicated to the inner tire but is dissipated, leaving the inner tire sufficiently cool to prevent overheating, and this dissipation of the heat laterally also tends to reduce the temperature of the outer rim and tire.

If desired a thin sheet metal ring P may be attached to the inner end of the brake drum and this sheet metal ring is formed with louvres P′ by means of which a definite quantity of air can be drawn through the brake drum according to the direction of the louvres.

In the construction shown in Fig. 3 the plate attached to the inner end of the brake drum is upset as indicated at P² and the louvres are formed at P³ and upon the front side of the brake drum I may also employ another plate P⁴ having louvres P⁵ so that the air can be forced through the brake drum in the direction indicated, it being understood that the air can be forced in either direction according to the directing position of the louvres and the construction of the wheel body. It will be understood that air can be pulled in at the center in one direction and blown out near the periphery in the opposite directon and vice versa, and in some cases it may be advisable to have the brake drum so constructed, these features of course being employed in connection with my deflecting band or shield. This materially aids in keeping the brake drum cool, causing as it does currents of air to pass through the brake drum and, as before stated, the encircling band or shield E will cause the lateral direction of air currents across the exterior of the brake drum, blowing out the heated air which would otherwise accumulate between the brake drum and the rim base.

If desired water cooled brake shoes can be employed or the shoes could be made of bronze, aluminum or any other metal of high conductivity in order to more readily conduct the frictional heat into the shoes and thereby prevent the heat accumulating in the brake drum.

If desired, I may place a covering Q of asbestos, upon the exterior of the brake drum and held in place by wire bands Q′. This covering of asbestos will still further prevent the communication of heat from the exterior surface of the brake drum to the adjacent rim base. This protective covering may be dispensed with if desired. The sheet metal plates with the louvres may also be dispensed with but I have found that they contribute advantageously to the general effect sought. The principal operative feature, however, is the deflecting band or shield E which is interposed between the spaced tire carrying rims for the purpose of preventing the radial escape of the currents of air generated by the movement of the wheel body, such arrested cooling currents being deflected laterally thereby cooling the rim bases and blowing off the heated air from the brake drum and maintaining the brake drum at a much lower working temperature.

It will thus be seen that I provide an exceedingly simple and highly efficient device capable of carrying out all of the objects hereinbefore recited.

This application is a continuation of my previously filed application, Serial No. 110,090, filed May 19, 1926.

Having thus described my invention I am aware that numerous and extensive departures may be made therefrom but without departing from the spirit of my invention.

I claim:

1. The combination with a wheel body and a pair of tire carrying rims arranged upon said wheel body, said body adapted by its rotation to deliver air radially between said rims, said rims being spaced laterally apart upon said wheel body, and means interposed between said rims to arrest the radial passage of air current therebetween.

2. The combination with a wheel body of an inner tire carrying rim and an outer tire carrying rim arranged upon said wheel body and spaced laterally apart, said body adapted by its rotation to deliver air radially between said rims, and an encircling band arranged about the wheel body and between the rims to prevent the radial passage of air currents between said rims.

3. The combination with a wheel body, of a pair of laterally spaced tire carrying rims arranged upon said wheel body, said body adapted by its rotation to deliver air radially between said rims, and a deflecting shield interposed between said rims and adapted to prevent the radial passage of air between said rims.

4. The combination with a wheel body having a brake drum connected thereto, of a pair of demountable tire carrying rims arranged upon said wheel body, said body adapted by its rotation to deliver air radially between said rims, one of said rims surrounding said brake drum, and a deflector interposed between the tire carrying rims adapted to prevent the radial escape of air therebetween and deflect the air currents between the rim and brake drum.

5. The combination with a wheel body capable of setting up currents of air while in rotation, of a pair of tire carrying rims arranged upon said wheel body and spaced laterally apart and means interposed between said rims for preventing the radial escape of said air currents, said means deflecting laterally said air currents as set forth.

6. The combination with a wheel body capable of creating air currents during rotation, a brake drum connected to said wheel body, a pair of tire carrying rims arranged upon said wheel body and spaced laterally apart and means interposed between said rims for preventing the radial escape of said air currents, said means deflecting said air currents laterally between one of said rims and the exterior of the brake drum.

7. In automobile wheels, the combination with a wheel body, air fanning spokes therefor, a pair of tire carrying rims mounted thereon in relative spaced relation, an annular brake drum telescoped within one of said rims, supported by said body, said drum having its peripheral surface disposed closely adjacent the inner surface of said rim, and an air deflector interposed between the rims to restrain the radial passage of air therebetween.

8. In automobile wheels, the combination with a wheel body, including a wheel hub, a pair of tire carrying rims mounted thereon in relative spaced relation, an annular brake drum telescoped within one of said rims, supported by said body, said drum having its peripheral surface disposed closely adjacent the inner surface of said rim, said wheel body formed with air fanning portions intermediate its hub and said rims, and an air deflector interposed between the rims to restrain the radial passage of air therebetween.

9. In automobile wheels, the combination with a wheel body, a pair of tire carrying rims mounted thereon in relative spaced relation, an annular brake drum telescoped within one of said rims, supported by said body, said drum having its peripheral surface disposed closely adjacent the inner surface of said rim, and an air deflecting band interposed between the rims to restrain the radial passage of air therebetween.

In testimony whereof I hereunto affix my signature this 27 day of October, 1930.

ORREL A. PARKER.